Nov. 9, 1965 R. E. PAIGE Re. 25,895

HONEYCOMB PAPER STRUCTURE

Original Filed Jan. 18, 1961 2 Sheets-Sheet 1

INVENTOR.
RICHARD E. PAIGE

BY Armand L. Rochenbach

ATTORNEY

HONEYCOMB PAPER STRUCTURE

Original Filed Jan. 18, 1961 2 Sheets-Sheet 2

INVENTOR.
RICHARD E. PAIGE

BY Howard E. Rackenbach
ATTORNEY

United States Patent Office

Re. 25,895
Reissued Nov. 9, 1965

25,895
HONEYCOMB PAPER STRUCTURE

Richard E. Paige, 411 E. 57th St., New York 22, N.Y.

Original No. 3,170,831, dated Feb. 23, 1965, Ser. No. 83,483, Jan. 18, 1961. Application for reissue Apr. 7, 1965, Ser. No. 457,887
4 Claims. (Cl. 161—14)

Matter enclosed in heavy brackets [ ] appears in the original patent but forms no part of this reissue specification; matter printed in italics indicates the additions made by reissue.

This invention relates to decorative and ornamental objects, and more particularly to a new construction of honeycomb paper structures.

The desirability of illumination in decorative and ornamental objects is an accepted fact. Its application to such objects has been in endless profusion. Despite this widespread use of light, in the art of honeycomb paper manufacture, which has been developed for over half a century, all honeycomb paper devices have been confined to the simulation of material objects (bells, trees, balls, etc.) and have depended for their beauty on the fascinating, decorative, three-dimensional forms of the typical, diamond-shaped openings which characterize this long familiar material. Its ability to ship flat and open to a light weight, apparently solid physical form has been its chief asset.

No use has been made of the natural translucence of honeycomb paper. Though the great preponderance of honeycomb paper devices employ tissue-thin weight of paper, which has desirable translucence, no honeycomb paper structures have ever been lighted from within. The multiplicity of tissue layers which usually vary from about fifty to one hundred or more layers, depending upon the size of finished object, suggest the blocking of light, rather than its transmission, however, this need not be so.

It will be recalled that certain paper structures have been lighted, for example, the familiar Japanese lanterns and the newer, crimped paper lanterns, each in a variety of forms. Both have one common structural characteristic: they are formed from paper which is of single-sheet, hollow-ball construction, hence present maximum transmission of light.

When an electric lamp is placed within a honeycomb paper structure as is presently manufactured, it exposes to one's eyes a harsh direct glare of the naked lamp through the open mesh of the honeycomb paper. The stark light of such a device is not only lacking in beauty, it is most upleasant.

It is one of the objects of this invention to hide the glaring lamp despite the open mesh of honeycomb paper, and to take advantage of the natural translucence of the tissue to make a structure which can be wholly lighted with a soft, diffused glow throughout. This softly glowing, wholly lighted honeycomb structure is the invention, whether the decorative form given it be a tree or lantern, as herein illustrated, or, as bell, ball, or other ornament.

Honeycomb structures have been well known in the art. Such structures are constituted of a plurality of sheets of tissue paper, each sheet superposed upon another, the sheets being joined together along parallel glue lines staggered on alternate sheets of paper. Such structure may be progressively built up until an appropriate and desired thickness is attained. The blankets of sheet material thus formed are then die cut according to the particular shape desired, for instance, of a bell or other article. In die cutting the blanket, however, it has been the practice in the art to place the glue lines on the blanket of sheet material perpendicular to the vertical axis of the article being formed.

Thus, when the honeycomb structure is stretched open into a decorative object, the hexagonal open tube-ends (actually closer to a diamond shape) which characterize this material, are disposed at right angles to the axis around which the honeycomb is being expanded. The numerous, stiff glue lines act as slim levers upon which the expanding outer periphery of the honeycomb object exerts force upon the inner axial binding, thus giving the person erecting the object, a leverage for stretching the outer, unbound periphery.

Although the honeycomb structure has further been utilized to simulate varying natural, as well as mechanical structures, such simulation has, at best, been superficial due to the die cutting method employed. For example, the general outline of a Christmas tree has successfully been attained, yet such structural rendition has completely lacked the realism of its boughs and natural flowing lines.

It is therefore an object of the present invention to provide a structure made from honeycomb paper which departs from the all-over diamond pattern now limiting the decorative scope of this material. By departing from the typical right-angles-to-the-axis honeycomb construction, and utilizing the glue lines in a more diagonal plane, and when appropriate to the object, even parallel to the axis, not only will the light source remain hidden and the glow achieved, but, the form of the structure itself departs from the diamond form and becomes instead, long, sweeping boughs, for a tree, or vertical spines, for a lantern, thus expanding the scope of decorative capabilities of the material.

Another object of the present invention is the provision of deflecting or light diffusing means in a paper honeycomb structure which will radiate the beams of light from the source so that a diffused lighting of the structure results, in a pleasing, uniform illumination of the entire structure and of its component parts.

A further object of this invention is to simulate the natural curvatures and contours of objects of nature into which honeycomb structures may be fashioned, as well as to impart depth and a three-dimensional effect thereto.

In general, achievement of the foregoing objects and advantages of the present invention is secured by angularly die-cutting a blanket of sheet material in order to attain a more natural contour and simulate the depth of an object of nature. The die-cut structure is further provided with a hollowed portion in which means for imparting illumination is provided, and is further provided with reinforcing means along a vertical axis at the hollowed portion which will provide leverage heretofore unattainable in a honeycomb device which is provided with such hollowed center. Particular provision is made for angularly disposed die cuts so that the resulting honeycomb structure is so disposed that a beam of light may be deflected and so diffused that a radiating light results. The present invention further utilizes the glue lines of the blanket of sheet material at specific points of the simulated article so that a more realistic effect of an object of nature results, as well as providing for support of a particular section of the object itself.

Other objects, advantages and inventive characteristics of this new and unique device will become apparent to those versed in the art from the following description of the present invention as illustrated in the accompanying drawings in which similar reference characters identify similar parts in the several views and in which.

Figure 2:
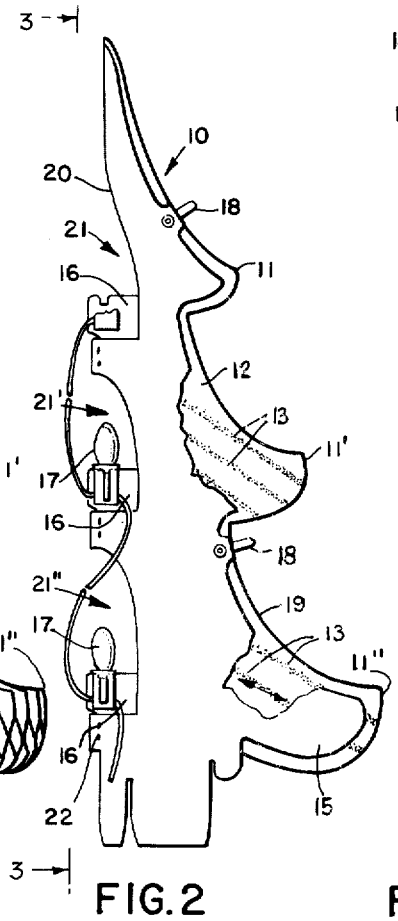
FIG. 2 is a plan view of the ornament folded.
Figure 3:
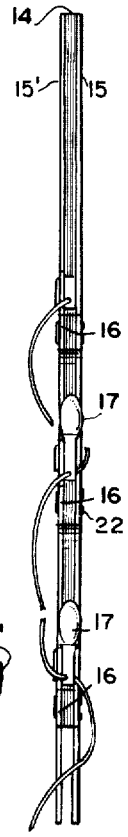
FIG. 3 is a view taken on line 3—3 of FIG. 2.

Referring now to the drawings, one embodiment of the present invention is illustrated in the form of a Christmas tree 10. The tree 10 is initially formed in the usual manner with a plurality of boughs 11, 11', 11'' and comprises a plurality of adjacently superposed layers of paper 12 joined together along parallel glue lines 13 staggered on alternate sheets of paper to form a honeycomb blanket structure 14. The blanket structure 14 is then die-cut generally assuming the configuration as shown in FIG. 2 in a manner presently to be described. The outermost layer of the blanket structure 14 on either side thereof is secured to reinforcing strips 15, 15' of cardboard or like material, such strips 15, 15' assuming the general configuration of the die-cut blanket structure 14. The reinforcing strips 15, 15' are additionally provided with light holding means 16 to which may be secured a light source 17 and fastening means 18 for retaining the ornamental structure 10 when in an opened position.

In die cutting the blanket structure 14 according to the present invention, light deflecting and reinforcement means 40 are formed by disposing the parallel glue lines 13 diagonally with respect to the vertical axis of said ornament 10, such glue lines being disposed angularly in relation to a plane at right angles to the vertical axis of the device. Thus, in the embodiment of the present invention, as shown in a simulated Christmas tree 10, the glue lines 13 being disposed along the outer longitudinal edge 19 of the tree 10, will result in a downwardly inclined pattern simulating the boughs of a tree and will therefore be on an oblique plane with respect to the vertical axis of the simulated tree 10. Such obliquely disposed glue lines 13 are substantially within a range of from 20° to 70° with respect to the vertical axis of the simulated tree 10.

The opposing longitudinal edge 20 of blanket structure 12 is provided with a plurality of hollow, cavernous areas 21, 21', 21'', providing means such as a chamber, in which a light source 17 may be placed. Said edge 20 is further secured by hinging means 22 which serves as a binding along such edge 20, as well as providing necessary leverage in expanding the ornament 10 to an open position. The light holding means 16 is an extension of one reinforcing strip 15 protruding into said cavernous area 21, 21', 21'' and is adapted to secure a light source 17 such as a socket and bulb thereto. The reinforcing strip 15, 15' may further be extended below the bottom edge of the blanket structure 12 to serve as a stand 23 for the simulated tree 10 when in an expanded position.

In the use of such ornamental simulated tree 10 such device is opened by rotating the reinforcing strips 15, 15' toward each other through a 360° arc until they are in back to back engagement thereby opening said blanket structure 11 to an expanded position and secured in such expanded position by fastening means 18, such as clips or the like, provided in spaced relationship along one edge 19 of the reinforcing strips 15, 15'.

Figure 1:
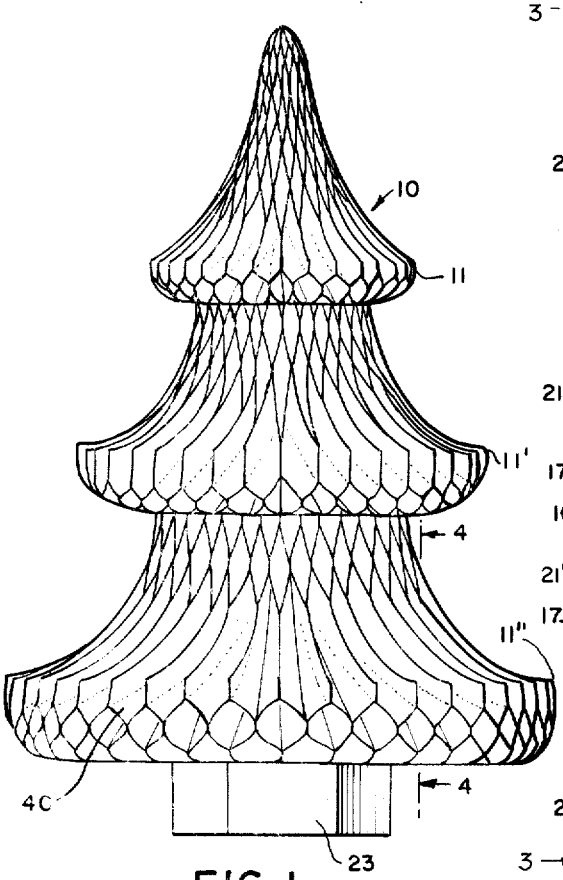
FIG. 1 is a plan view of one embodiment of an ornamental object in the form of a Christmas tree according to the present invention.
Figure 4:
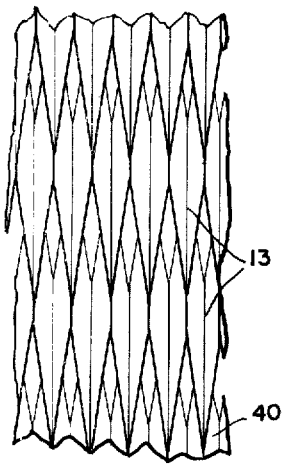
FIG. 4 is a view taken on line 4—4 of FIG. 1.

As illustrated in FIGS. 1 and 4, because of the particular disposition of the glue lines 13 the sweeping bough-like configuration 11, 11', 11'' of the tree 10 is given planned support at the point of greatest weakness, i.e. along the edges 19 thereof. Such disposition of the glue lines 13, it will further be evident, avoids the static symmetry of a honeycomb structure as heretofore known. Further, such angular disposition of the glue lines 13 simultaneously results in providing deflecting means 40 in the form of an obliquely disposed fluted structure of the honeycomb as illustrated in FIG. 4, which will diffuse any beam of light and will result in a more realistic appearance than heretofore attainable. Additionally, the angularity of such glue lines 13 imparts a three dimensional effect to the bough-like formation of the tree 10 so as to more clearly simulate an object of nature.

Although reference has been made to a simulated tree 10 in which glue lines 13 are so disposed so as to constitute light deflecting and reinforcement means 40, it is within the ambit of the present invention that the edgewise disposition of such glue lines 13, with respect to the material object being simulated, whether it be a mechanical object or an object of nature employing honeycomb blanket structure 14, will serve as light deflecting and reinforcement means 40 thereto.

Figure 5:
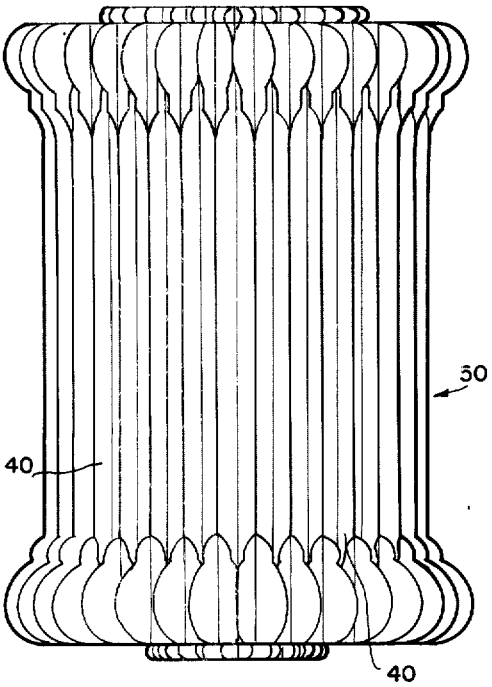
FIG. 5 is a plan view of another embodiment of an ornamental object according to the present invention.
Figure 6:
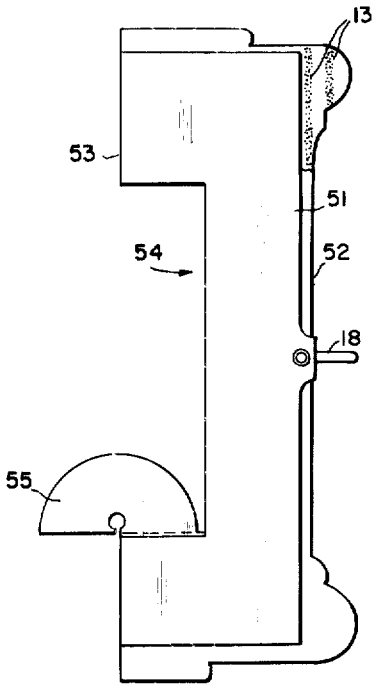
FIG. 6 is a plan view of the ornament as shown in FIG. 5 in folded position.
Figure 7:
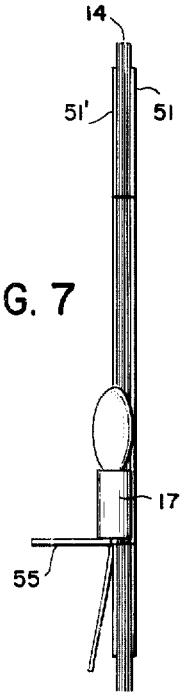
FIG. 7 is an end view of the device as shown in FIG. 6.

For example, in another embodiment of the present invention as illustrated in FIGS. 5 to 7 the light deflecting and reinforcement means 40 are utilized in a simulated lantern 50 fashioned from a blanket structure 14 by die-cutting or the like, and assuming a generally rectangular configuration as illustrated in FIG. 5. Reinforcing strips 51, 51' assuming the general configuration of the die-cut blanket structure 14, are secured to the outermost leaves of said blanket structure 14 on either side thereof. Fastening means 18 are provided along the outer longitudinal edge 52 of reinforcing strip 51 for retaining the ornamental structure 50 in an opened position. The inner longitudinal edge 53 is inwardly cut so as to provide a hollowed area 54 when the structure 50 is in its expanded position. Light holding means 55 adapted to secure a light source 17 is provided and may be comprised of a substantially semi-circular disc extending from reinforcing strip 51 inwardly into hollowed area 54 and hingeably affixed thereto, so as to fold in a substantially flat position within the hollowed area 54 when ornament 50 is in its expanded position. Light holding means 55 may further be disposed in the upper portion of hollowed area 54, or alternately in any position therein.

It is particularly to be noted that the disposition of the light deflecting and reinforcement means 40 are vertically disposed in the present embodiment and in parallel relationship to the vertical axis of the ornament 50 so as to diffuse any direct ray of light emanating from the hollowed portion 54, as well as providing reinforcement along the longitudinal edge 52 of the device 50 in its expanded position.

Figure 8:
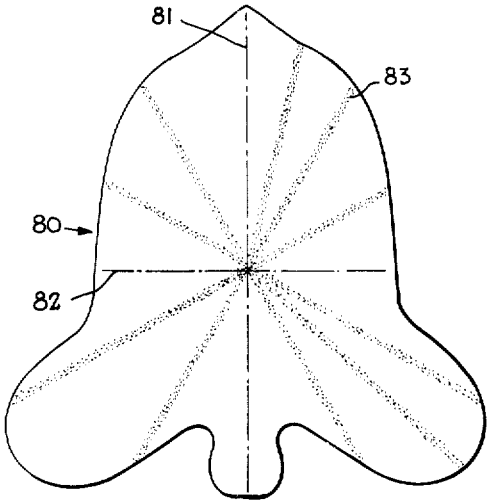
FIG. 8 is a plan view of an ornamental device employing a honeycomb paper structure showing the disposition of glue lines with relation to the vertical axis of such device.

Referring now to FIG. 8, the present invention is illustrated in the form of a bell-shaped honeycomb structure 80, showing the axial center 81 of the device 80, the line or plane 82 perpendicular to said axial center 81 and light, radially disposed lines or glue lines 83 indicating the various degrees of angularity which may be utilized as the angle in which such glue lines 83 may be disposed in order to deflect as well as hide a naked light from the viewer's eyes, and to impart a glow to the structure. If the device 80 were intended for hanging high, glue lines 83 would slant upwardly as shown in the upper half of FIG. 8 so as to prevent the light from being seen through the honeycomb opening. If, on the other hand, the device 80 were hung low or at eye level, the glue lines 83 would be downwardly disposed as shown in the lower half of FIG. 8.

While the invention described here is in the embodiment of a tree 10 and a lantern 50, it is obvious to those skilled in the art that a lighted bell, ball, ornament, etc. is clearly within the scope of the invention and is readily adaptable to the teachings set forth herein.

Further, the substitution of sheets of cellophane or foil for the sheets of tissue, while producing an altered effect, still lies within the scope of the invention as set forth. Cellophane honeycomb lights more transparently, while foil, a completely opaque material, nevertheless takes on a most pleasing glow as the inner, open ends of the tubes 40 pick up the shafts of central light and reflect them down the shiny metallic surfaces of the tube 40 to the exposed open end. The structure can be used as described; the finished effect differs with the material used.

Moreover, it will be understood that the glue lines 13, as pointed out above, do not extend parallel to a plane disposed at right angles relative to an axis extending vertically through the tree 10, the lantern 50, or any other object it is desired to simulate in appearance. The glue lines are angularly directed with respect to such a plane, to diffuse the light produced by the light source 17, enabling the object to present a soft, diffused glow. It may be said, therefore, that the glue lines 13 are angularly directed relative to a plane and preferably within the range of 20° to 90° therefrom, which plane is disposed substantially at right angles with respect to an axis positioned to extend generally coincident with the longitudinal edge of an object, for example, the longitudinal edge 20 of the tree 10. Such an edge, as is considered readily apparent, defines the vertical axis of the tree. Within the just described range, the glue lines 13 may be acutely angularly disposed relative to the plane, as would be the case in the instance of the tree 10, or at right angles with respect thereto (parallel to the vertical axis), as would be the case in the instance of the lantern 50.

Further, although the broad application of light to honeycomb structures is the basic premise of this disclosure, the fact must not be obscured that the new physical form has been given to this long familiar material, and such transformation of physical appearance is desirable apart from its use in lighted structures. The desirability of a more attractive form for honeycomb structure is obvious.

I claim:

1. An ornamental device simulating in its expanded condition an object of predetermined shape, comprising a plurality of superposed leaves, said leaves being joined by a plurality of parallel glue lines staggered on alternate sheets thereof whereby a substantially honeycomb blanket is formed, said blanket along the outer longitudinal edge thereof being contoured in simulation of the peripheral edges of said object, the inner longitudinal edge of said blanket being contoured whereby a hollowed portion is formed to completely enclose a light bulb, hinging means securing together the inner longitudinal edges of said leaves above and below the hollowed portion, reinforcing strips of substantially the same outline as that of said blanket secured to the outermost leaves thereof, fastening means secured along the outer longitudinal edge of one of said reinforcing strips to retain said blanket in an expanded condition, said parallel glue lines being angularly disposed with relation to the vertical axis of said ornamental device within a range of 70° from the vertical axis whereby the light rays from the enclosed lamp are deflected from a horizontal path to provide a diffuse glow.

2. An ornamental device simulating in its expanded condition an object of predetermined shape, comprising a plurality of superposed leaves, said leaves being joined by a plurality of parallel glue lines staggered on alternate sheets thereof whereby a substantially honeycomb blanket is formed, said blanket along the outer longitudinal edge thereof being contoured in simulation of the peripheral edges of said object, the inner longitudinal edge of said blanket being contoured whereby a hollowed portion is formed to completely enclose a light bulb, hinging means securing together the inner longitudinal edges of said leaves above and below the hollowed portion, reinforcing strips of substantially the same outline as that of said blanket secured to the outermost leaves thereof, fastening means secured along the outer longitudinal edge of one of said reinforcing strips to retain said blanket in an expanded condition, said parallel glue lines being substantially parallel to the vertical axis of said ornamental device whereby the light rays are substantially completely diffused.

*3. An ornamental device simulating in its expanded condition an object of predetermined shape, comprising a plurality of superposed leaves, said leaves being joined by a plurality of parallel glue lines staggered on alternate sheets thereof whereby a substantially honeycomb blanket is formed, said blanket along the outer longitudinal edge thereof being contoured in simulation of the peripheral edges of said object, the inner longitudinal edge of said blanket being contoured whereby a hollowed portion is formed to enclose a light bulb, reinforcing strips of substantially the same outline as that of said blanket secured to the outermost leaves thereof, fastening means secured along the outer longitudinal edge of one of said reinforcing strips to retain said blanket in an expanded condition, said parallel glue lines being angularly disposed with relation to the vertical axis of said ornamental device within a range of 70° from the vertical axis whereby the light rays from the enclosed lamp are deflected from a horizontal path to provide a diffused glow.*

*4. An ornamental device simulating in its expanded condition an object of predetermined shape, comprising a plurality of superposed leaves, said leaves being joined by a plurality of parallel glue lines staggered on alternate sheets thereof whereby a substantially honeycomb blanket is formed, said blanket along the outer longitudinal edge thereof being contoured in simulation of the peripheral edges of said object, the inner longitudinal edge of said blanket being contoured whereby a hollowed portion is formed to enclose a light bulb, reinforcing strips of substantially the same outline as that of said blanket secured to the outermost leaves thereof, fastening means secured along the outer longitudinal edge of one of said reinforcing strips to retain said blanket in an expanded condition, said parallel glue lines being substantially parallel to the vertical axis of said ornamental device whereby the light rays are substantially completely diffused.*

References Cited by the Examiner

The following references, cited by the Examiner, are of record in the patented file of this patent or the original patent.

UNITED STATES PATENTS

| | | |
|---|---|---|
| D. 135,823 | 6/43 | Schmid. |
| 753,781 | 3/04 | Wundsch et al. |
| 1,784,474 | 12/30 | Wilson. |

FOREIGN PATENTS

| | | |
|---|---|---|
| 102,448 | 11/37 | Australia. |
| 457,237 | 7/13 | France. |
| 175,300 | 9/06 | Germany. |

OTHER REFERENCES

Brazel Novelty Co., Cat. #78, received May 10, 1933, Cincinnati, Ohio, pp. 55, FIGURE 5.

JACOB H. STEINBERG, *Primary Examiner.*